United States Patent
Sinha et al.

(10) Patent No.: US 9,569,744 B2
(45) Date of Patent: Feb. 14, 2017

(54) PRODUCT NOTICE MONITORING

(75) Inventors: Vineet Sinha, Eagan, MN (US); Ajmal Nasar, Eagan, MN (US)

(73) Assignee: Symberion Corp., Minneapolis, MN (US)

( * ) Notice: Subject to any disclaimer, the term of this patent is extended or adjusted under 35 U.S.C. 154(b) by 1058 days.

(21) Appl. No.: 13/563,502

(22) Filed: Jul. 31, 2012

(65) Prior Publication Data

US 2014/0040305 A1    Feb. 6, 2014

(51) Int. Cl.
*G06F 17/30* (2006.01)
*G06Q 10/08* (2012.01)

(52) U.S. Cl.
CPC .................... *G06Q 10/08* (2013.01)

(58) Field of Classification Search
CPC ................................................. G06F 17/30368
USPC ........................................................ 707/769
See application file for complete search history.

(56) References Cited

U.S. PATENT DOCUMENTS

| | | | |
|---|---|---|---|
| 7,356,393 B1 * | 4/2008 | Schlatre ................. | G06Q 10/06 340/438 |
| 8,036,914 B1 | 10/2011 | Pinsonneault | |
| 8,145,574 B1 | 3/2012 | Hancock et al. | |
| 2003/0074272 A1 * | 4/2003 | Knegendorf ....... | G06Q 30/0601 705/26.1 |
| 2003/0216969 A1 * | 11/2003 | Bauer .................. | G06K 7/0008 705/22 |
| 2004/0030590 A1 | 2/2004 | Swan et al. | |
| 2005/0004811 A1 | 1/2005 | Babu | |
| 2008/0208883 A1 | 8/2008 | Hernandez et al. | |
| 2009/0132330 A1 * | 5/2009 | Shaw ..................... | G06F 9/542 705/7.29 |
| 2009/0204415 A1 | 8/2009 | Baiera | |
| 2009/0254535 A1 * | 10/2009 | Eickelmann ...... | G06F 17/30864 |
| 2009/0300065 A1 * | 12/2009 | Birchall ................ | G06Q 10/10 |
| 2010/0036755 A1 * | 2/2010 | Saghbini ............... | G06F 19/327 705/28 |
| 2010/0198701 A1 | 8/2010 | Bonner et al. | |

(Continued)

OTHER PUBLICATIONS

"U.S. Appl. No. 13/894,201, Advisory Action mailed Dec. 18, 2015", 2 pgs.

(Continued)

*Primary Examiner* — Noosha Arjomandi
(74) *Attorney, Agent, or Firm* — Schwegman Lundberg & Woessner, P.A.

(57) ABSTRACT

Various embodiments include at least one of systems, methods, and software for product notice monitoring. Some embodiments include at least one product notice database that is an aggregation of product notices, such as product recalls, bulletins, safety notices, updated usage guidelines, and the like, that may be issued by various different sources. The product notice database is monitored in such embodiments in view of products of an organization to identify possible matches. When a possible match is identified, the notice is provided to the organization. Some embodiments may include routing the notice to particular people or departments responsible for the relevant product(s) of the notice. The matching in some embodiments may be relative matching based on one or more forms of fuzzy logic, which allows for approximate matching, although not necessarily identical. The product notice monitoring may be performed in whole or in part in the cloud.

20 Claims, 8 Drawing Sheets

(56) References Cited

U.S. PATENT DOCUMENTS

| | | | |
|---|---|---|---|
| 2011/0173028 A1* | 7/2011 | Bond | G06Q 10/08 705/3 |
| 2011/0257991 A1* | 10/2011 | Shukla | G06Q 10/087 705/2 |
| 2011/0258065 A1 | 10/2011 | Fordyce, III et al. | |
| 2012/0150552 A1* | 6/2012 | Belady | G06Q 10/30 705/1.1 |
| 2012/0185399 A1 | 7/2012 | Draper | |
| 2013/0036061 A1* | 2/2013 | Alexander | G06Q 30/014 705/303 |
| 2013/0117187 A1* | 5/2013 | Small | G06Q 30/06 705/303 |
| 2013/0268445 A1 | 10/2013 | Casady et al. | |
| 2013/0282593 A1* | 10/2013 | Merz | G06Q 30/0601 705/303 |
| 2014/0006131 A1* | 1/2014 | Causey | G06Q 10/0875 705/14.24 |
| 2014/0236844 A1 | 8/2014 | Shaw et al. | |
| 2014/0343986 A1 | 11/2014 | Sinha et al. | |

OTHER PUBLICATIONS

"U.S. Appl. No. 13/894,201, Final Office Action mailed Sep. 10, 2015", 21 pgs.

"U.S. Appl. No. 13/894,201, Non Final Office Action mailed Feb. 29, 2016", 22 pgs.

"U.S. Appl. No. 13/894,201, Non Final Office Action mailed Apr. 17, 2015", 15 pgs.

"U.S. Appl. No. 13/894,201, Respnse filed Dec. 10, 2015 to Final Office Action mailed Sep. 10, 2015", 23 pgs.

"U.S. Appl. No. 13/894,201, Response filed Aug. 17, 2015 to Non Final Office Action mailed Apr. 17, 2015", 16 pgs.

\* cited by examiner

PRODUCT NOTICE MONITORING

BACKGROUND INFORMATION

Product notices are issued by many different entities, such as manufacturers, distributors, retailers, government and non-government organizations, and others. Product notices are often related to product recalls, safety warnings, maintenance checks, and other such advisories.

Organizations utilize a large number of products in furtherance of their efforts. Monitoring notices that are issued with regard to such products that are utilized or sold by an organization can be a very difficult and time-consuming task. Notices relevant to products used and sold by an organization need to be identified, considered by the appropriate employees, and often, action must be taken. The larger the organization, in terms of both employee size and the number of products utilized and sold, the larger the effort involved. Further confounding notice monitoring is the distributed nature of many organizations across broad geographic regions.

DETAILED DESCRIPTION

Figure 1:
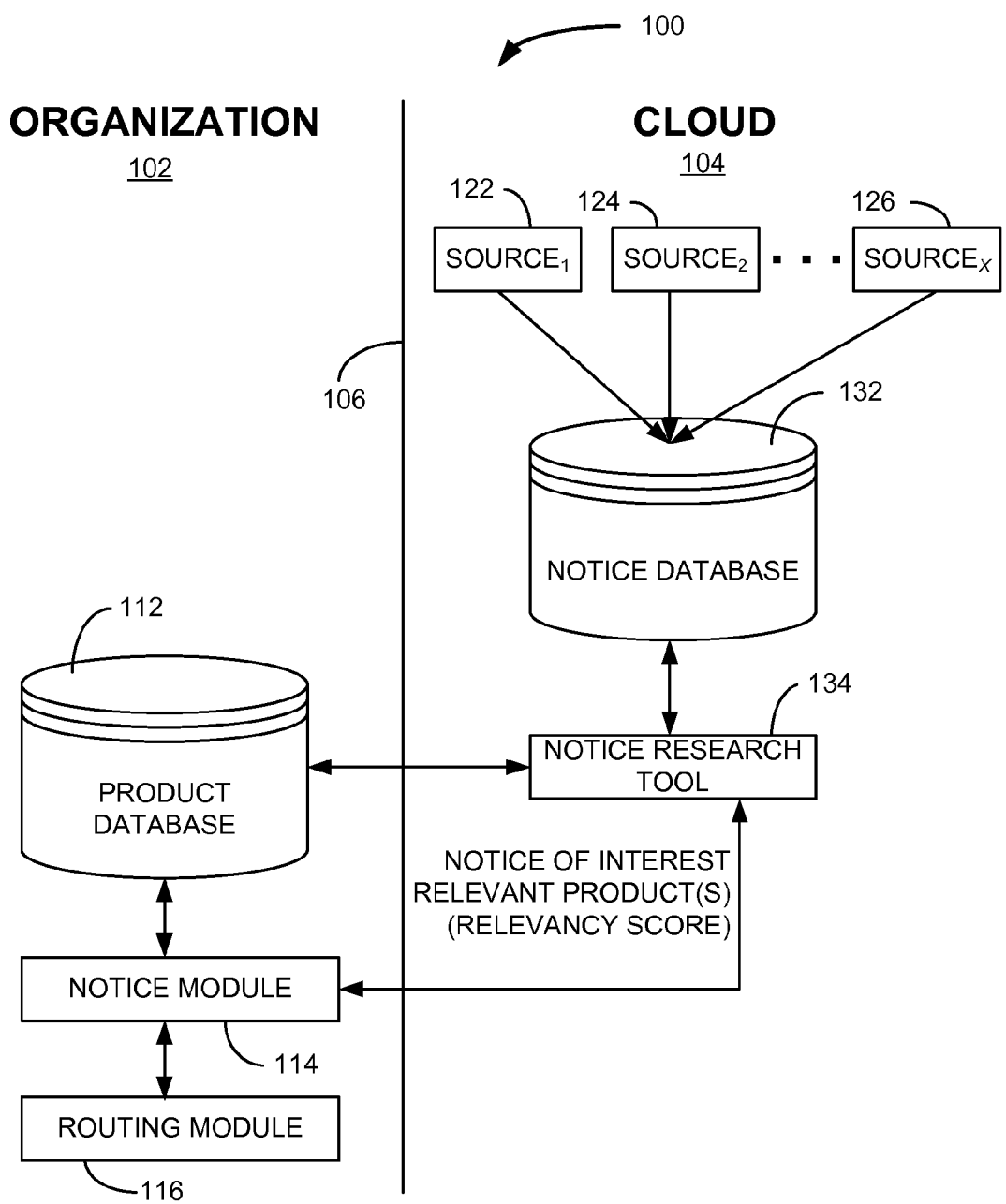
FIG. 1 is a logical block diagram of a system, according to an example embodiment.

Various embodiments herein include at least one of systems, methods, and software to facilitate product notice monitoring. At a high-level, such embodiments include at least one product notice database that is an aggregation of product notices, such as product recalls, bulletins, safety notices, updated usage guidelines, and the like, that may be issued by various different sources. The product notice database is monitored in such high-level embodiments in view of products of an organization to identify possible matches. When a possible match is identified, the notice is provided or obtained by the organization and considered. Some such embodiments may further include routing the notice to particular people or departments responsible for the relevant product, or products, of the notice. The routing of notices to the particular people or departments to whom the particular notices are relevant prevents notices from being sent to those to whom the particular notice is irrelevant. As a result, notices are more likely to receive the attention needed rather than being considered a nuisance-type notice. The matching in such embodiments may be a relative match based on one or more forms of fuzzy logic, which allows for approximate matching, although not necessarily identical.

The sources of notices may be virtually any source that may provide product notices such as the Consumer Product Safety Commission (CPSC), other government entities, product manufacturers, distributors, wholesale and retail outlets, consumer advisory groups, user groups, and other such sources. These notices may be received or retrieved by an entity maintaining the one or more product notice databases. The product notice database in some embodiments may be monitored by cloud-based notice research tool that receives or retrieves data from a subscribing organization of products to be monitored. The product notice database in other embodiments may be monitored by a notice research tool deployed within or otherwise utilized by a subscribing organization that has access to data of products to be monitored independent of the product notice database or the entity maintaining the product notice database. These and other embodiments are illustrated and described herein.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

FIG. 1 is a logical block diagram of a system 100, according to an example embodiment. The system 100 is an example of various components that may be deployed in some embodiments in different computing environments to facilitate product notice monitoring. The example system 100 includes a computing environment 102 of an organization and a cloud-computing environment 104 of an entity that maintains a product notice database 132. Product notice services may be provided from the cloud-computing environment 104 for one or many product notice service subscribers. The computing environment 102 of the organization and the cloud-computing environment 104 are connected via at least one network 106. The at least one network 106 generally includes the Internet, but may also include one or more other networks that facilitate the connections there between or may operate thereon, such as local area networks, wide area networks, system area networks, virtual private networks, and the like.

The computing environment 102 of the organization includes at least one product database 112 and a notice module 114. Some embodiments of the computing environment 102 of the organization may also include a routing module 116.

The at least one product database 112 may be a single database or a portion of a single database that stores data representative of products an organization utilizes, has in inventory for its own use or sale, products that have been sold or previously used or otherwise deployed, products utilized on behalf or otherwise with regard to the organization, or other products that are somehow related to the organization. In some embodiments, the product database 112 may instead be process that is executed to retrieve product data from various data storage locations, which may be both internal and external to the organization.

Product data stored in the product database may include data of many different varieties. For example, the product data may identify products by one or more of manufacturer, distributor, retailer, model number, serial number, lot number, description, version, manufacture or production date, production factory, geographic location of origin, and the like.

The cloud-computing environment 104 will now be described and the notice module 114 and the routing module 116 of the computing environment 102 of the organization will be described further below.

The cloud-computing environment 104 includes a product notice database 132 and a notice research tool 134. As illustrated, the cloud-computing environment 104 also includes sources 122, 124, and 126. While one or more sources 122, 124, and 126 may exist in the cloud-computing environment 104, the sources 122, 124, and 126 are illustrated as within the cloud-computing environment 104 generally for illustrative convenience.

The product notice database 132 includes data representative of product notices issued by various entities, as discussed previously. The product notice database 132 may be populated with product notices in a variety of ways. For example, product notices may be received or retrieve as data formatted according a standardized product notice data format, as a text data file, or other data format. Product notices may also be entered into the product notice database 132 by a human. In some embodiments, a product notice document may be scanned, text may be identified by an optical character recognition process, and one or both of the text and the document image may be stored to the product notice database 132.

Regardless of how the product notice database 132 is populated with data of product notices, the data in the product notice database 132 may be stored an indexed in many ways, depending on the particular embodiment. In some embodiments, records of the product notices stored in the product notice database 132 include a plurality of data items related to one or more products the particular product notice is relevant to. Such data items may include one or more of manufacturer, distributor, retailer, model number, serial number, lot number, description, version, manufacture or production date, production factory, geographic location of origin, and the like.

In some embodiments, the notice research tool 134 included in the cloud-computing environment of the system 100, monitors product notices stored in the product notice database 132 in view of products represented in the product database 112 of the organization. The notice research tool 134, in some embodiments, is a process that executes on a computing device within the cloud-computing environment 104 and exposes data and services to requestors, such as via web services. In some embodiments, the notice research tool 134 may access the product database 112 to obtain data with regard to products represented therein and determine if there are any product notices represented in the product notice database 132 relevant to those products. In other embodiments, the notice module 114 within the computing environment 102 of the organization may submit queries to the notice research tool 134 with regard to individual products represented in the product database 112. In further embodiments, the notice module 114 may submit product data with regard to a plurality of products represented in the product database 112 to the notice research tool 134. In such embodiments, the notice research tool 134 upon receipt of product data from the notice module 114 determines with regard to each product represented in the received product data whether there are any relevant product notices included in the notice database 132. Thus, in various embodiments, the determination of whether there are product notices represented in the notice database 132 relevant to products represented in the product database 112 can be driven, or triggered, from either the notice research tool 134 or the notice module 114.

Typical embodiments of the notice research tool 132 also include mechanisms to prevent sending the same product notice to the notice module 114 more than once. Such mechanisms may include a table in the notice database where entries are made with regard to a product notice when sent. Then prior to sending a notice, the table is queried to determine if the notice was previously sent. In some embodiments, the query of the notice database 132 may contemplate data in that table to avoid an additional database operation. In other embodiments, a record of notices sent may be maintained and stored in a different data structure, such as a file. Other mechanisms may be included in various embodiments depending on design preferences, database usage and available capacity, and other factors and requirements of particular embodiments.

The triggering of the determination may be in response to a user submitted command to either the notice module 114 or the notice research tool 134. In other embodiments, the triggering of the determination may automatic in view of a configuration setting that identifies a periodic basis at which the determination is to be performed, a scheduling of the determining such as at a time when network or system usage is relatively low, or other automatic triggering scheme.

The determination by the notice research tool 134 of whether products represented in the product database 112, or as identified in a query received from the notice module 114, have relevant notices in the product notice database 132 is performed, in some embodiments according to a fuzzy logic algorithm that identifies approximate matches. As the data in the product notice database 132 may not be normalized, or at least is unlikely to be normalized in a same manner as product data stored in the product database 112, utilization of fuzzy logic allows likely matches to be identified.

The fuzzy logic in some embodiments utilizes a scoring scheme and at least one threshold value that is utilized to declare a likely match between a product represented in the product database 112 and a product notice in represented in the product notice database 132. For example, if a model number is matched, a score of 100, 100%, 1.00, or other such value may be attributed to the match and the product notice will be forwarded to the notice module 114 within the computing environment 102 of the organization. Another example may involve a less certain matching, such as a match of a product descriptions and manufacturing dates, but a mismatch or missing data with regard to other data elements such as a missing lot number included in a product record of the product database. In such a situation, a score value may be counted for each match, such as 10 points, 10%, or other scoring value, the scores may be summed, and then the sum compared against a threshold value. When the threshold is met, the product notice will be forwarded by the notice research tool 134 to the notice module 114 within the computing environment 102 of the organization. The threshold, in some embodiments, is a configurable parameter. Thus, if an organization finds too many irrelevant product notices are being identified, the threshold can be adjusted higher, and vice versa.

When the notice research tool 134 forwards a product notice to the notice module 114, the notice module 114 may retrieve the product notice from the product notice database 132 and forward the data of the product notice, such as through the routing module 116. In other embodiments, a hyperlink or other network address of the product notice from which the product notice may be retrieved is forwarded. The product notice may also be provided in other ways depending on the particular embodiment. In some embodiments, regardless of how the product notice is forwarded to the notice module 114, a relevancy score may also be provided. The relevancy score will typically be a score of, or derived from, the fuzzy logic matching algorithm that indicates a degree to which the match was made or a likely relevance of the identified product notice. In addition, when a product notice is forwarded to the notice module 114, an identifier of one or more products the notice is determined to pertain to is also typically included.

The notice research tool 134 may forward the product notices to the notice module 114 in a number of different ways, depending on the particular embodiment. In one embodiment, product notices may be sent as formatted data directly to the notice module 114 of the network 106. The notice module 114 in such embodiments may include a data interface for this purpose. In other embodiments, the notice research tool 134 may cache product notices to be sent and send an indication to the notice module 114 that product notices are available for download. The notice module 114, in such embodiments, may then download the product notices, either automatically or upon receipt of a command from a user, such as a product notice administrator of the organization. In another embodiment, the identified product notices may be attached by the notice research tool 134 to one or more emails that are then sent to an email address associated with the notice module 114. In other embodiments, the notice research tool 134 may send the identified product notices in other ways, as will be readily apparent to a person having ordinary skill in the art.

The notice module 114, upon receipt of a product notice from the notice research tool 134, either pushed by the notice research tool 134 or pulled or retrieved from the notice research tool 134, will then process the product notice. The processing of a product notice by the notice module 114 includes storing the product notice and other data received therewith. When the data included with the product notice includes a hyperlink or other network address from which to download the product notice, the notice module 114 may download and store the actually product notice based on the hyperlink or other network address. The notice module, in some embodiments, may also route received product notices by forwarding a product notice to, or otherwise calling, the routing module 116.

The routing module 116 typically routes product notices based on additional data. The additional data the product notices are routed by may include data such as location or assignment data with regard to products in the product database 114. Location data may indicate where respective products are stored, utilized, or are otherwise located. Notices may then be routed to a person or department responsible for such areas as may be defined elsewhere in data. Assignment data is similar to location data, but instead is data that associates respective products to people, roles, or departments responsible in some way for a particular product represented in the product database 114. A product may be associated with one or more of both of a location and an assignment and even a plurality of one or both. Once the routing destination(s) are determined by the routing module 116, the routing module 116 may then communicate the product notices in any number of ways. For example, notices may be sent via email, within a workflow system that may also track actions taken and tasks performed with regard to notices, printed and sent via intra-organization mail, and other electronic and out-of-band mechanisms, systems, and arrangements. The routing module 116, by routing notices to those to whom the notices are more likely relevant also means not routing notices to those to whom the notices are unlikely to be relevant. As a result, upon receipt of a notice, the user is more likely to actually review the notice as it is more likely to be relevant than not. By eliminating irrelevant notices, the system of the particular embodiment becomes more useful and reliable.

Thus, the system 100 of FIG. 1 provides a cloud-based computing solution allowing organizations to closely and accurately monitor product notices. While the cloud-computing environment 104 is illustrated and described as being separate from the computing environment 102 of the organization, the cloud-computing environment 104 may be a cloud of the same organization, within the same computing environment 102 of the organization, a cloud-computing environment leased by the organization, or other cloud-computing arrangement. Further, other architectural modifications may be made in different embodiments and to accommodate differing system requirements. For example, FIG. 2 illustrates an embodiment where the notice research tool 134 does not reside in the cloud-computing environment 104.

Figure 2:
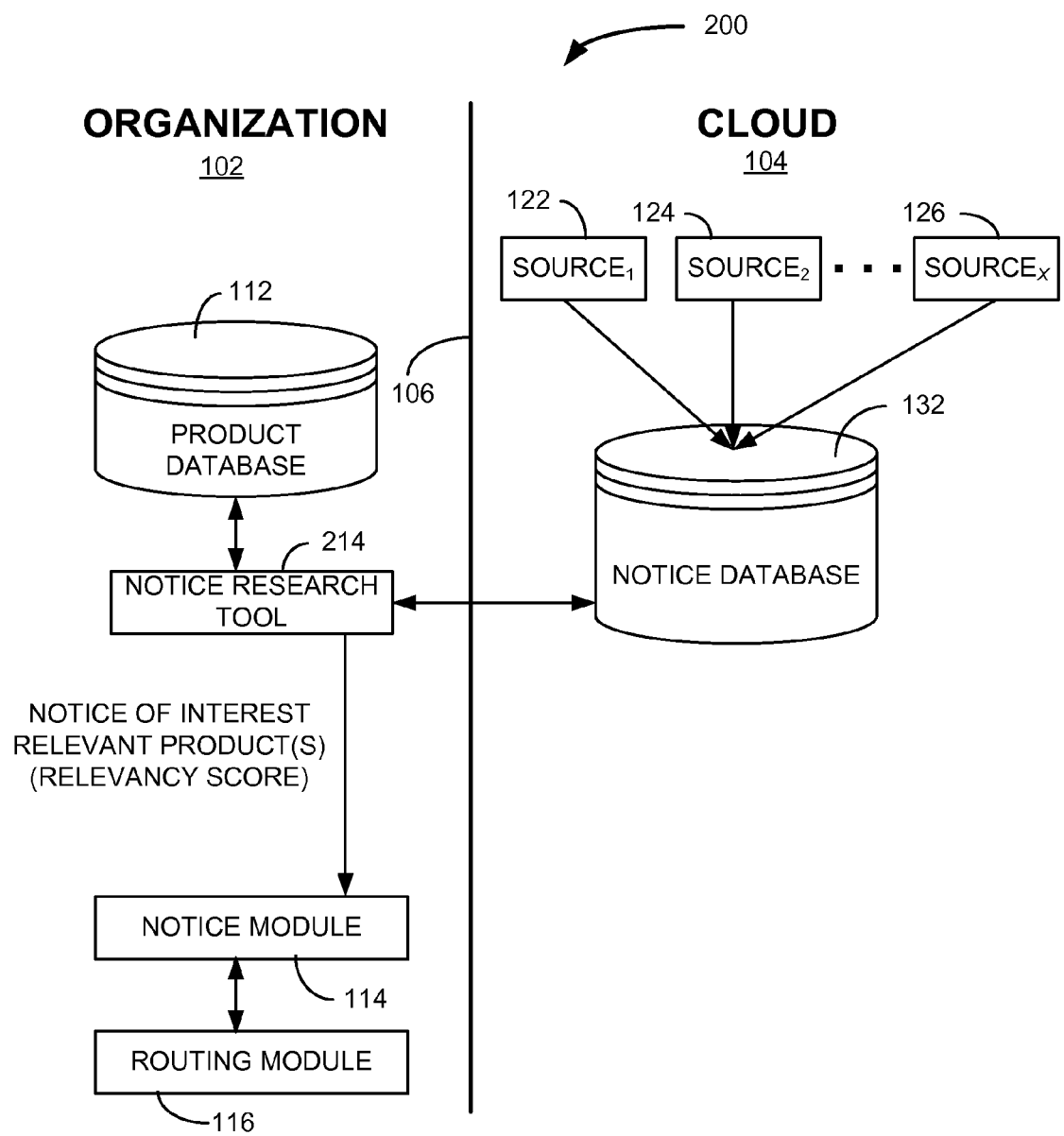
FIG. 2 is a logical block diagram of a system, according to an example embodiment.

FIG. 2 is a logical block diagram of a system 200, according to an example embodiment. The system 200 includes the computing environment 102 of the organization and the cloud-computing environment 104. The cloud-computing environment 104 includes the product notice database 132 that is populated with product related notices from the sources 122, 124, and 126 as in the system 100 as described above with regard to FIG. 1. The computing environment 102 of the organization includes the product database 112, the notice module 114, and optionally the routing module 116, also similar to the system 100 of FIG. 1. However, the notice research tool 214 resides and executes within the computing environment 102 of the organization rather than in the cloud-computing environment 104.

The notice research tool 214 of the system 200 performs essentially the same functions as the notice research tool 134 of the system 100 in FIG. 1, but instead accesses the product notice database 132 via the at least one network 106. In some embodiments, the notice research tool 214 and the notice module 114 may be integrated into a singular computer program.

Figure 3:
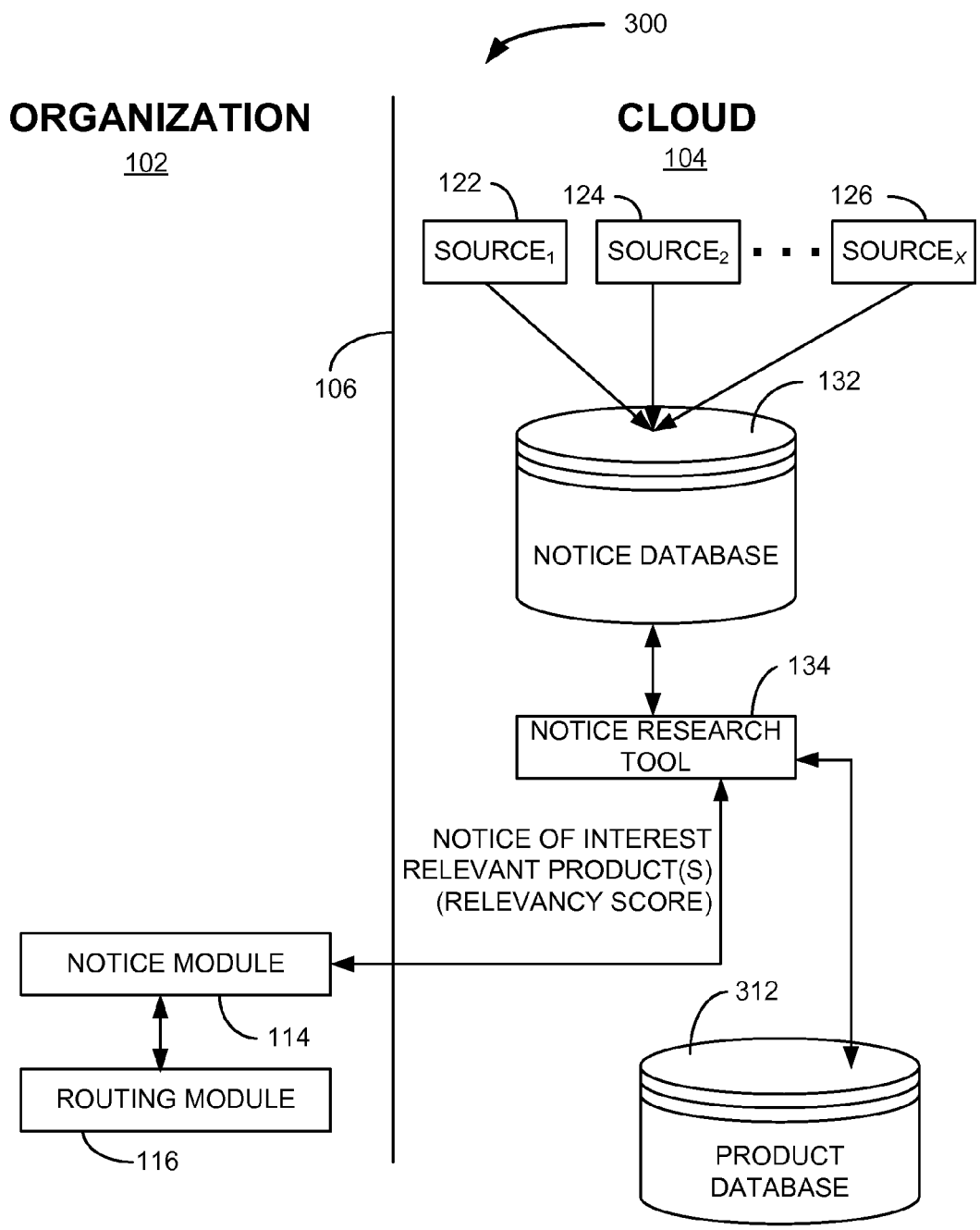
FIG. 3 is a logical block diagram of a system, according to an example embodiment.

FIG. 3 is a logical block diagram of a system 300, according to an example embodiment. The system 300 includes the computing environment 102 of the organization and the cloud-computing environment 104. The cloud-computing environment 104 includes the product notice database 132 that is populated with product related notices from the sources 122, 124, and 126 as in the system 100 as described above with regard to FIG. 1. The cloud-computing environment 104 further includes a product database 312, which holds essentially the same data as the product database 112 of FIG. 1 and FIG. 2, but is instead a cloud-based database that stores data of products of the organization. The computing environment 102 of the organization in the system 300 further includes the notice module 114, and optionally the routing module 116, also similar to the system 100 of FIG. 1 and the system 200 of FIG. 2. The notice research tool 134, as in the system 100 of FIG. 1, resides and executes within the cloud-computing environment 104.

The notice module 114 of each of FIG. 1, FIG. 2, and FIG. 3 may include various user interfaces for various functions. Such functions may include viewing of product notices, viewing one or more queues of product notices that have been determined as likely relevant to at least one product, and triggering or scheduling a check of the product notice database 132 for product notices. Some other functions that may be facilitated through user interfaces of the notice module 132 may include receiving input with regard to actions taken with regard to product notices (i.e., ignore the notice, return of product to the manufacture, perform remedial action to the product, etc.), forwarding product notices to other individuals, groups, or departments, and other functions that may be desired in various embodiments with regard to product notices. An example of one such user interface is provided in FIG. 4.

Figure 4:
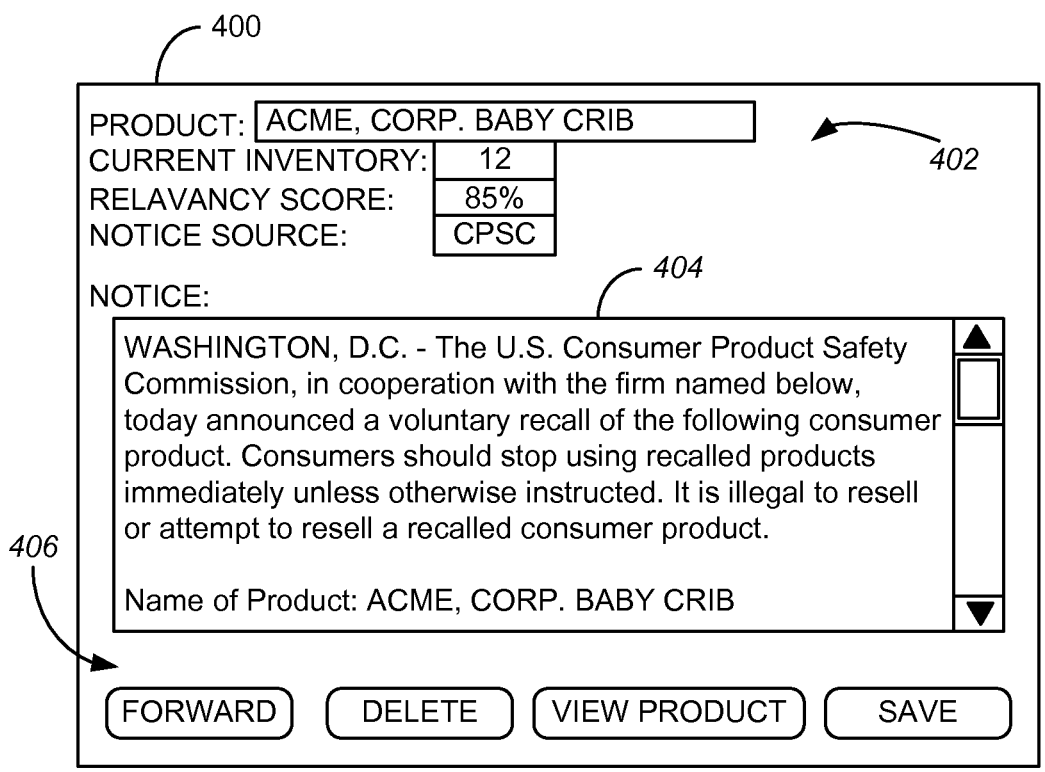
FIG. 4 is a user interface illustration, according to an example embodiment.

FIG. 4 is a user interface 400 illustration, according to an example embodiment. The example user interface 400 is a user interface through which multiple functions may be facilitated. For example, the user interface 400 presents a product notice to a viewer in a notice-viewing portion 404 with regard to a product identified in various fields 402 of the user interface 402.

The user interface 400 may also present additional data in the various fields, such as a current inventory of the identified product, which may be obtained from the product database 112, or other database of the particular embodiment. The inventory field allows the viewer to quickly determine if the product is still in use or being offered for sale, which may influence a decision of an action that may need to be taken with regard to the product notice presented in the notice-viewing portion 404.

The various fields 402 may also include data indicative of the relevancy score of the product notice with regard to the particular product that may have been determined by the notice research tool 114, 214 as discussed above with regard to FIG. 1, FIG. 2, and FIG. 3. The relevancy score in various embodiments may indicate to the viewer how likely it is that the product notice pertains to the actual product identified in the user interface.

A source of the notice may also be presented in the various fields 402, such as the Consumer Product Safety Commission (CPSC). The source of a notice may be of particular importance with regard to some notices, such as when the notice is from a governmental entity that may also have regulatory authority over the organization to require that certain actions be taken with notices. The source may also be helpful to inform the view as to the veracity, severity, and importance of the notice.

In some embodiments, the various fields 402 may include different numbers of fields that convey some of the same and different information with regard to notices. For example, in a hospital setting, for a product that may be installed in or otherwise used with regard to a patient, an additional field may be presented to indicate a number of patients possibly impacted by the product notice. Another example in a retail setting may present not only a current inventory, but also data indicative of a number of the product sold and another field with data indicative of a number of the product on order. Thus, the data presented in the various fields may differ between embodiments based on a number of factors including the context within which the embodiment is implemented.

The user interface 400 may further include a set of action buttons 406. The action buttons 406 may provide a viewer abilities to take actions with regard to a notice being viewed. For example, the viewer may choose a forward button to cause the viewed product notice to be forwarded (via a workflow system, email, or other communication mechanism) to another individual, department, company, and the like. The viewer may also be presented with and choose a delete button to cause the viewed product notice to be discarded or ignored. Another of the action buttons 406 may provide a viewer the ability to view the product or at least further detailed data with regard to the product. A further of the action buttons 406 may allow the viewer to save the viewed product notice for consideration at a later time, archiving, or other purposes.

In other embodiments, the user interface 400 and other user interfaces may be customized to the needs of a particular embodiment, a particular organization utilizing the embodiment, to a particular user's needs or desires, and the like. For example, different fields may be added or removed, a notes field may be included to allow for work-in-progress or other notes to be added, additional action buttons may be provided that are relevant to different actions that may be taken with regard to a notice, and other such modifications and customization.

Figure 5:
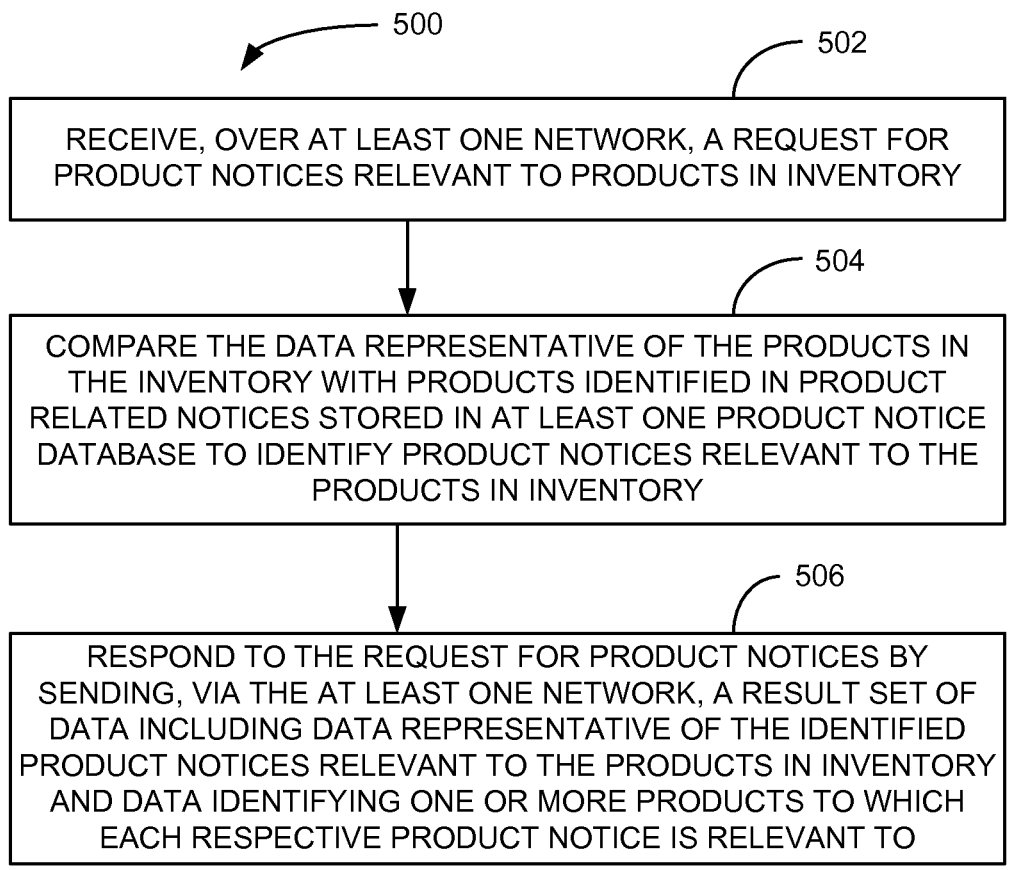
FIG. 5 is a block flow diagram of a method, according to an example embodiment.

FIG. 5 is a block flow diagram of a method 500, according to an example embodiment. The method 500 is an example of a method that may be performed by a cloud-based notice research tool 114 as illustrated in FIG. 1. The method 500 includes receiving 502 a request for product notices relevant to products in inventory. In some such embodiments, receiving 502 the request also includes receiving data representative of products in inventory.

The method 500 further includes comparing 504 the data representative of the products in inventory with products identified in product related notices stored in at least one product notice database to identify product notices relevant to the products in inventory. When product notices are identified, the method 500 includes responding 506 to the request for product notices by sending a result set of data including data representative of the identified product notices relevant to the products in inventory and data identifying one or more products to which each respective product notice is relevant.

In the comparing 504 of the method 500, the identifying of product notices relevant to a product inventory may include comparing data representative of the product in inventory to data of a product related notices to obtain a relevancy score. In such embodiments, when the relevancy score from the comparing meets a threshold, the product related notice is included in the result set, which may also include the obtained relevancy score associated with each product related notice.

Figure 6:
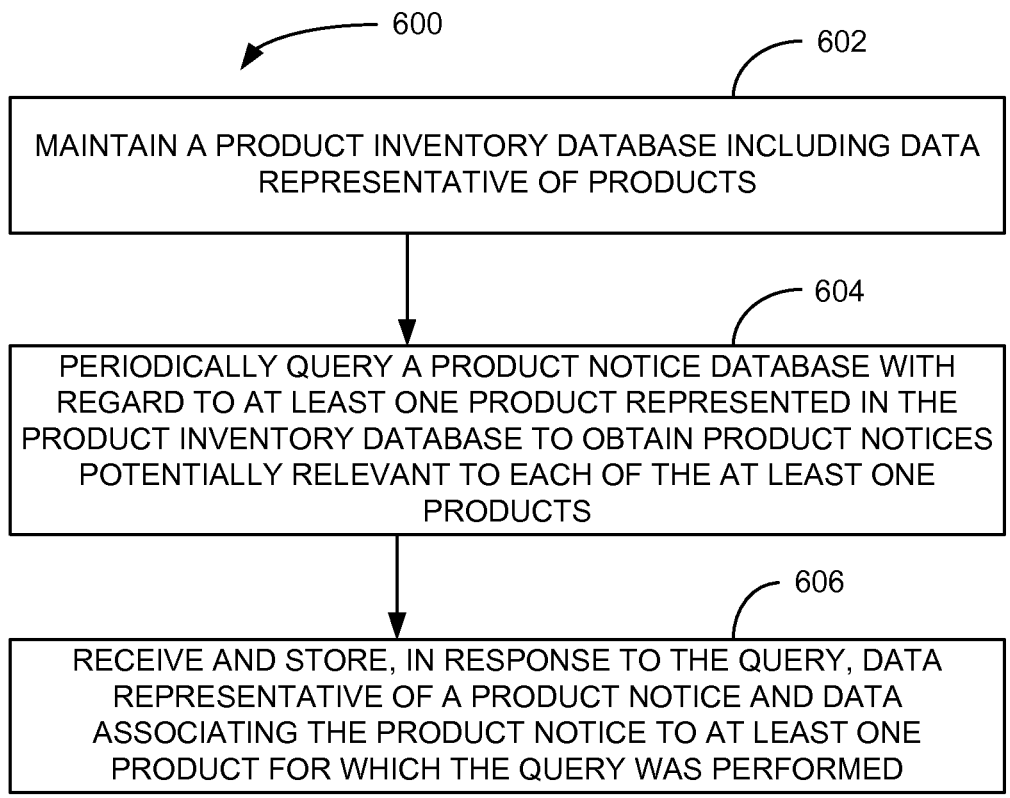
FIG. 6 is a block flow diagram of a method, according to an example embodiment.

FIG. 6 is a block flow diagram of a method 600, according to an example embodiment. The method 600 is an example of a method that may be performed in whole, or in part, by a notice module 114, 214 as illustrated and described above with regard to FIG. 1 and FIG. 2. The method 600 includes maintaining 602 a product inventory database including data representative of products and periodically querying 604 a product notice database with regard to at least one product represented in the product inventory database. The querying 604 is performed to obtain product notices potentially relevant to each of the at least one products. In response to the querying 604, the method 600 includes receiving and storing 606 data representative of at least one product notice and data associating each of the at least one product notice to at least one product for which the query 604 was performed.

In some embodiments, the periodic querying 604 is performed on a periodic basis defined in a configuration setting of a computing application that performs the method 600. The period may be hourly, daily, weekly, monthly, or other period as may be chosen by an administrator or as otherwise set in a particular embodiment.

In some embodiments of the method 600, following the receiving and storing 606 of the data representative of the product notices, each product notice associated with a product represented in the product database is processed in view of relevancy rules associated with product notice routing destinations. The relevancy rules when applied by the processing typically provide a relevancy score with regard to each product notice. The relevancy score in such embodiments may be with regard to a particular person, group, or department to which the product notice might be routed. In such embodiments, when the relevancy score for a product notice with regard to a routing destination meets a threshold, the method 600 includes routing a representation of the product notice according to a routing rule of the respective routing destination.

Figure 7:
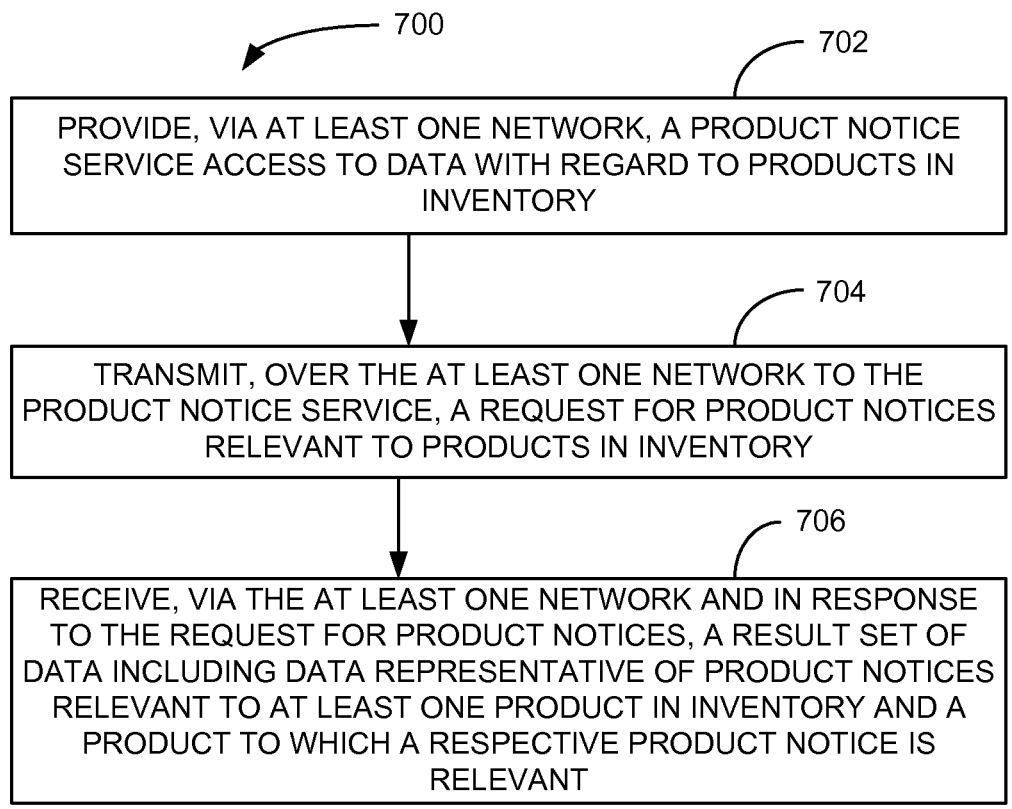
FIG. 7 is a block flow diagram of a method, according to an example embodiment.

FIG. 7 is a block flow diagram of a method 700, according to an example embodiment. The method 700 is an example of a method that may be performed to access product notice services provided in a cloud-computing environment. Some embodiments of the method 700 include providing 702, via at least one network, a product notice service access to data with regard to products in inventory. Providing 702 the product service access to data with regard to product in inventory, in various embodiments, may include providing an interface to a database storing product related data, transmitting product data with a request, and the like.

The method 700 further includes transmitting 704, over the at least one network to the product notice service, a request for product notices relevant to products in inventory. In response to the transmitted 704 request, the method 700 includes receiving 706, via the at least one network, a result set of data including data representative of product notices relevant to at least one product in inventory and a product to which a respective product notice is relevant.

Figure 8:
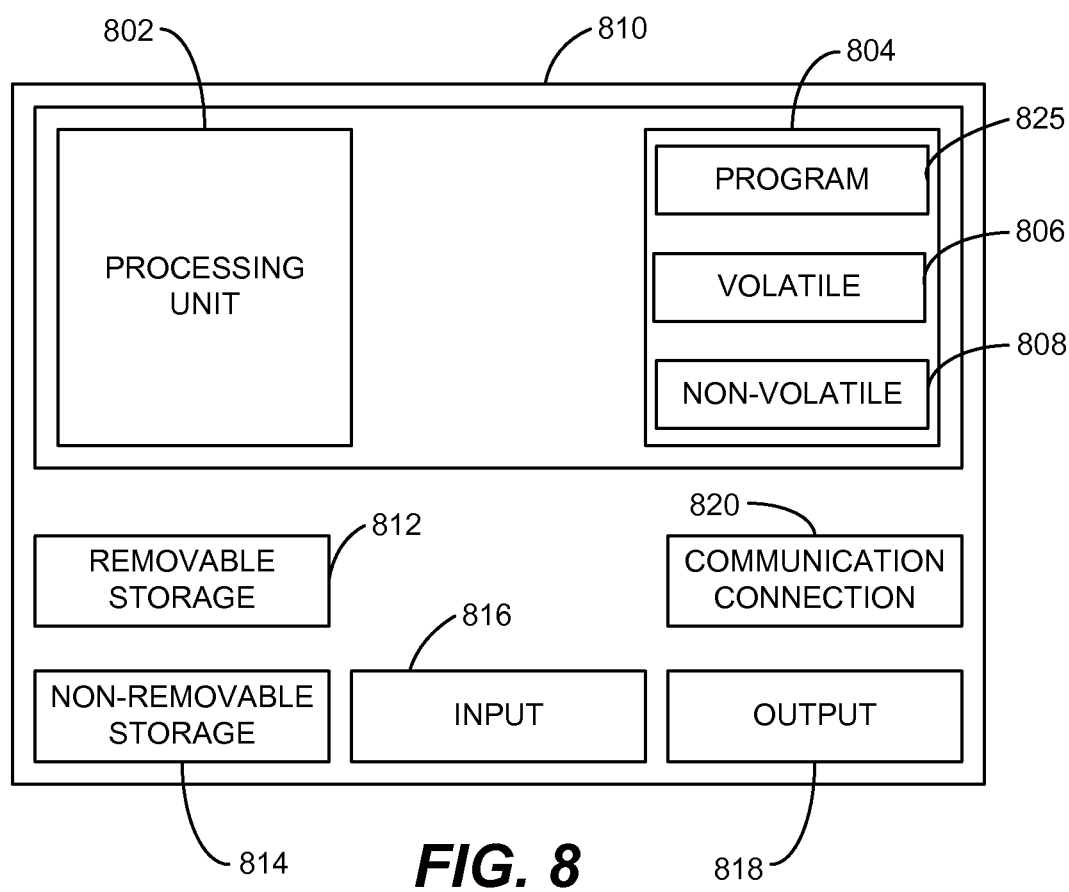
FIG. 8 is a block diagram of a computing device, according to an example embodiment.

FIG. 8 is a block diagram of a computing device, according to an example embodiment. In one embodiment, multiple such computer systems are utilized in a distributed network to implement multiple components in a transaction-based environment. An object-oriented, service-oriented, or other architecture may be used to implement such functions and communicate between the multiple systems and components. One example computing device in the form of a computer 810, may include a processing unit 802, memory 804, removable storage 812, and non-removable storage 814. Memory 804 may include volatile memory 806 and non-volatile memory 808. Computer 810 may include—or have access to a computing environment that includes—a variety of computer-readable media, such as volatile memory 806 and non-volatile memory 808, removable storage 812 and non-removable storage 814. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 810 may include or have access to a computing environment that includes input 816, output 818, and a communication connection 820. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 802 of the computer 810. A hard drive, CD-ROM, and RAM are some examples of a computer-readable mediums, which are also non-transitory computer-readable mediums. For example, a computer program 825 capable of performing one or more, or portions, of the various methods illustrated and described herein.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A system comprising:
at least one processor, at least one memory device, and at least one network interface device;
at least one product notice database stored on the at least one memory device, the at least one product notice database storing data of product related notices; and
a research application stored on the at least one memory device and executable by the at least one processor to:
receive, via the at least one network interface device, a request for product notices relevant to organization products, the organization products including at least one of products previously sold by the organization and products on order;
receive, from an organization via the at least one network interface device, data representative of the organization products;
compare the data representative of the organization products with products identified in product related notices stored in the at least one product notice database, wherein comparing includes generating a relevancy score and comparing the relevancy score to a configurable matching threshold value, wherein the comparing identifies product notices relevant to the organization products when the relevancy score is at or above the matching threshold value;

determine a plurality of product notice actions to respond to the product notice, the plurality of product notice actions including a product notice forwarding action, a product notice deleting action, a product notice detail viewing action, and a product notice modification action; and respond to the request for product notices by sending, via the at least one network interface device, a result set of data including data representative of the identified product notices relevant to the organization products, data identifying one or more products to which each respective product notice is relevant to, data identifying a source of the product notice, data indicating a number of patients affected by the product notice, data indicating a number of a product sold and on order affected by the product notice, and data identifying the plurality of product notice actions.

2. The system of claim 1, wherein the result set includes the relevancy score associated with each product related notice indicating the relevancy of the product related notice to a respective product.

3. The system of claim 1, wherein the at least one memory device on which the at least one product notice database is stored is accessed via that at least one network interface device.

4. The system of claim 1, wherein data representative of the organization products is accessed, via the at least one network interface device, from a database of an organization from which the request for product notices is received.

5. The system of claim 1, wherein data representative of the organization products is received with the request for product notices.

6. A method comprising:

receiving, over at least one network, a request for product notices relevant to organization products, the organization products including at least one of products previously sold by the organization and products on order;

obtaining data representative of the organization products from a source of the request and comparing the organization products data with products identified in product related notices stored in at least one product notice database, wherein comparing includes generating a relevancy score and comparing the relevancy score to a configurable matching threshold value, wherein the comparing identifies product notices relevant to the organization products when the relevancy score is at or above the matching threshold value;

determining a plurality of product notice actions to respond to the product notice, the plurality of product notice actions including a product notice forwarding action, a product notice deleting action, a product notice detail viewing action, and a product notice modification action; and responding to the request for product notices by sending, via the at least one network interface device, a result set of data including data representative of the identified product notices relevant to the organization products, data identifying one or more products to which each respective product notice is relevant to, data identifying a source of the product notice, data indicating a number of patients affected by the product notice, data indicating a number of a product sold and on order affected by the product notice, and data identifying the plurality of product notice actions.

7. The method of claim 6, wherein the result set includes the relevancy score associated with each product related notice indicating the relevancy of the product related notice to a respective product.

8. The method of claim 6, wherein data representative of the organization products is accessed, via the at least one network interface device, from a database of an organization from which the request for product notices is received.

9. The method of claim 6, wherein obtaining data representative of the organization products includes receiving the product inventory data with the request for product notices.

10. The system of claim 1, wherein the a least one product notice action includes at least one of a product notice forwarding action, a product notice deleting action, a product notice detail viewing action, and a product notice modification action.

11. A method comprising:

maintaining an organization product database including data representative of organization products, the organization products including at least one of products previously sold by the organization and products on order;

periodically querying, through execution of instructions on at least one computer processor, a product notice database with regard to at least one product represented in the organization product database to obtain product notices potentially relevant to each of the at least one products, wherein querying includes generating a relevancy score and comparing the relevancy score to a configurable matching threshold value, wherein a product notice is potentially relevant to each of the at least one products when the relevancy score is at or above the matching threshold value, wherein querying includes determining a plurality of product notice actions to respond to the product notice, the plurality of product notice actions including a product notice forwarding action, a product notice deleting action, a product notice detail viewing action, and a product notice modification action; and receiving and storing, in response to the query, data representative of the identified product notices relevant to the organization products, data identifying one or more products to which each respective product notice is relevant to, data identifying a source of the product notice, data indicating a number of patients affected by the product notice, data indicating a number of a product sold and on order affected by the product notice, and data identifying the plurality of product notice actions.

12. The method of claim 11, wherein the periodic queuing is performed on a periodic basis defined in a configuration setting of a computing application that performs the method.

13. The method of claim 11, wherein the product notice database is remote to a system that performs the method and is accessed via at least one of the Internet, a virtual private network, and a web service.

14. The method of claim 11, further comprising: processing each product notice associated with a product represented in the product database received in response to the query in view of relevancy rules associated with product notice routing destinations, the relevancy roles when applied by the processing providing the relevancy score with regard to each product notice; and when the relevancy score for a product notice with regard to a routing destination meets a threshold, routing a representation of the product notice according to a routing role of the respective routing destination.

15. The method of claim 14, wherein the routing rule of the respective destination causes a representation of the product notice to be routed to at least one inbox of one or more users responsible for considering the product notice.

16. The method of claim 15, further comprising: presenting, within a user interface of a user associated with the routing destination, a representation of the product notice and one or more selectable options representing the at least one product notice action: and receiving a selection of one of the one or more selectable options; and storing data representing the selected option.

17. The system of claim 11, wherein the at least one product notice action includes at least one of a product notice forwarding action, a product notice deleting action, a product notice detail viewing action, and a product notice modification action.

18. A non-transitory computer-readable medium, with instructions stored thereon, which when executed by at least one processor of a computing device, causes the computing device to:
provide, via at least one network, a product notice service access to data with regard to organization products, the organization products including at least one of products previously sold by the organization and products on order;
transmit, over the at least one network to the product notice service, a request for product notices relevant to organization products; and
receive, via the at least one network and in response to the request for product notices, a result set of data including data representative of product notices relevant to at least one organization product, data representative of an organization product to which a respective product notice is relevant, data identifying the plurality of product notice actions to respond to the product notice, data identifying a source of the product notice, data indicating a number of patients affected by the product notice, data indicating a number of a product sold and on order affected by the product notice, and data representative of a relevancy score, wherein:
a product notice is relevant to at least one organization product when the relevancy score is at or above a configurable matching threshold value; and
the plurality of product notice actions includes a product notice forwarding action, a product notice deleting action, a product notice detail viewing action, and a product notice modification action.

19. The non-transitory computer-readable medium of claim 18, wherein providing the product notice service access to data with regard to the organization products includes providing an interface to a database storing product inventory data through which the product notice service accesses product inventory data via the at least one network.

20. The non-transitory computer-readable medium of claim 18, wherein providing the product notice service access to data with regard to the organization products includes transmitting data representative of at least one product in inventory with the request for product notices.

* * * * *